Dec. 15, 1953  T. J. FINAN  2,663,009
DEFLATED TIRE WARNING DEVICE
Filed Jan. 10, 1952
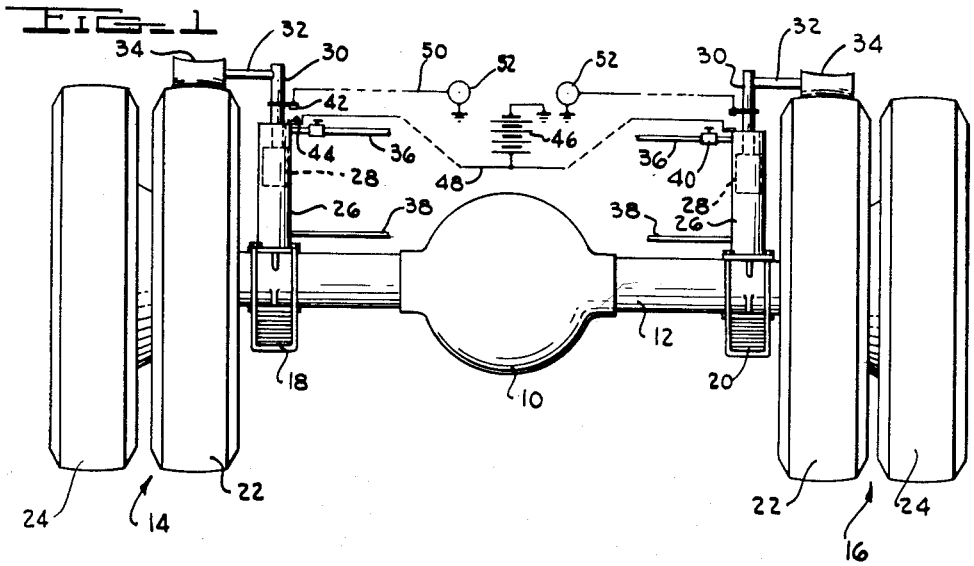
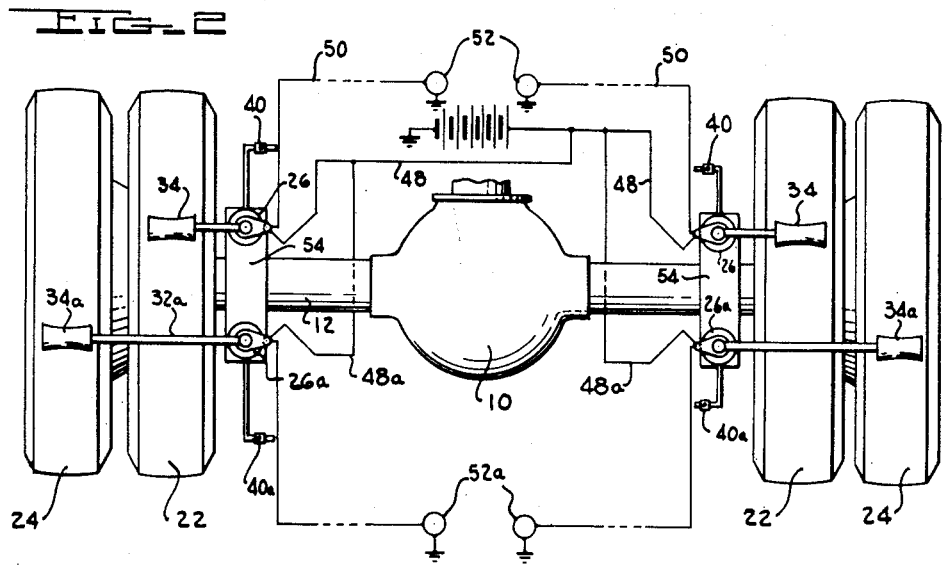
INVENTOR.
THOMAS J. FINAN
BY
ATTORNEY Patented Dec. 15, 1953

2,663,009

UNITED STATES PATENT OFFICE 2,663,009

DEFLATED TIRE WARNING DEVICE

Thomas J. Finan, Detroit, Mich.

Application January 10, 1952, Serial No. 265,906

4 Claims. (Cl. 340—58)

The present invention relates to a warning device for indicating a deflated tire which warning device is particularly but not exclusively adapted for use with dual wheel constructions.

In dual wheel constructions it is particularly difficult to detect one soft tire upon inspection since the other of the dual tires maintains the soft tire in a substantially normal position. Further, it is impossible to detect a tire which becomes soft during travel. Soft tires present a prominent problem in commercial vehicles. This problem is not only economic but also concerns the safety of the driver or passengers of the commercial vehicle and pedestrians or other drivers who happen to be near the vehicle when a soft tire causes a blow out.

If one of the tires develops a leak and becomes soft while the vehicle is in transit, the tire overheats and will often blow out. In some instances, this generation of heat will even cause the adjacent tire to blow out. Also, if one of the tires becomes soft the adjacent tire is subjected to an overload which it is not constructed to handle.

Of course such blow outs are very dangerous and conducive to severe accidents. In addition, such blow outs will often start a fire in the vehicle. It is obvious that such a fire can be disastrous in a vehicle such as a gasoline truck or a bus.

Therefore, although the public liability and property damage aspect as well as the tire cost factor are important to the owners of commercial vehicles, a more important aspect is the safety features. This aspect is recognized not only by the owners and drivers of commercial vehicles but also by the various safety commissions of the State and Federal Governments.

Devices have been developed in the past for warning the driver of a vehicle when a soft tire develops. However, applicant is well versed in the field of commercial vehicles and particularly transport vehicles, and to applicant's knowledge none of these devices is practical and no such device has been placed in operation. Some of the devices are based on faulty premises so that the devices are actually inoperative when used as intended. Other devices are complicated and depend upon minute adjustments and movements so that the devices are manufacturing nightmares and cannot be produced at a practical cost or marketed for less than a prohibitive price. Other devices will work only during certain conditions of the highways or during certain load conditions of the vehicle.

In view of the above, a principal object of the present invention is to provide a deflated tire warning device which is simple in construction and operation and which can be readily manufactured at relatively low cost.

It is another object of the present invention to provide such a deflated tire warning device which will work under all weather and highway conditions and which is operative whether the vehicle is loaded or not.

It is a further object of the present invention to provide such a deflated tire warning device which is sturdy in construction and which can readily be installed either as a part of original manufacture on a vehicle or which can be readily installed on vehicles already in use.

Other objects of this invention will appear in the following description and appended claims, reference being had to the accompanying drawings forming a part of this specification wherein like reference characters designate corresponding parts in the several views.

In the drawings:

Fig. 1 is a rear elevation of a dual wheel suspension embodying the warning device of the present invention applied to the inner wheels, the electrical circuit being shown schematically.

Fig. 2 is a plan view of the dual wheel suspension shown in Fig. 1, the electrical circuit again being shown schematically, and the warning device being illustrated as also applied to the outer wheels.

An embodiment of the present invention is illustrated in the drawings wherein a rear dual wheel structure is shown comprising generally the differential housing 10, the axle 12, the left wheel assembly 14, and the right wheel assembly 16. The left spring is indicated at 18 and the right spring is indicated at 20. These springs are of conventional construction.

The warning device of the present invention will be explained in relation to the left wheel assembly but it is to be understood that the device as illustrated operates in a like manner in relation to the right wheel assembly.

Since most of the present day commercial vehicles utilize air systems for brakes and the like, the construction shown in the drawings will be explained in connection with an air system. It will be evident, however, that any suitable fluid other than air may be used.

The dual wheel assembly 14 includes an inner tire 22 mounted on the inner wheel and an outer tire 24 mounted on the outer wheel. The warning device of the present invention includes means for engaging both of the said tires so that proper indication is registered when either tire becomes soft. The warning device comprises a first cylinder 26 having a piston 28 mounted therein. A connecting shaft 30 is affixed to the top of the piston 28 and extends upward out of the cylinder 26. Suitable O-rings or sealing rings are provided in the cylinder 26 around the connecting shaft 30 to prevent leakage of the air around the movable connecting shaft. A spindle 32 is affixed to the free end of the connecting shaft 30 and has a roller 34 rotatably disposed thereon. Suitable bearings are provided on the spindle to provide smooth rotation of the roller 34, and the roller 34 is curved to fit the contour of the periphery of the tire so that there is an even engagement between the tire and the roller. An inlet pipe is indicated at 36 and an outlet pipe is indicated at 38. The inlet pipe 36 leads from a source of air pressure to the top portion of the cylinder 26, and the outlet pipe 38 leads from the bottom portion of the cylinder 26 back to the reservoir. Inasmuch as the air system can be made of conventional structure, the details of the system are omitted for purposes of clarity in the drawing.

When the warning device is in operation, air is induced into the top of the cylinder 26 through the inlet pipe 36 and a bleed valve 49. The air is exerted against the top of the piston 28 under a predetermined pressure and thus the piston 28 holds the roller 34 in engagement with the tire 22 through the post 30 and spindle 32. If the tire 22 becomes soft the resistance effected by the tire against the roller 34 is reduced and the pressure on top of the piston 28 will force the said piston downward within the cylinder 26. This causes a first contact 42, affixed to the shaft 30, to engage a second contact 44 affixed to the top of the cylinder 26. This closes the circuit through the battery 46, wire 48, points 42 and 44, wire 50 and indicator 52. The indicator 52 is preferably located in the driver's cab and may be a light, warning buzzer, or combination of the both. Thus, indication is given immediately to the driver that the vehicle may be stopped before any serious danger is created.

When the device is in normal operation and the tires are inflated to normal pressure, the roller 34 rotates about the spindle 32 as rotary motion is imparted to it from the tire 22. The rotary motion of the tire also may tend to revolve the shaft 30 about its longitudinal axis. To prevent this, the shaft can be made of a non-circular cross section or other suitable means may be utilized to prevent such undesired movement. In this manner, the shaft 30 will move only in an axial direction.

Referring to Fig. 2 of the drawings it will be noted that the outer tire 24 is also provided with a warning structure. This structure is similar to the structure explained in connection with the inner tire 22, and like parts are labeled with like numbers having the letter "a" appended thereto. As previously explained, the right side of the vehicle is provided with a structure similar to the left side and it is believed that the operation of this portion of the device is obvious without further explanation. It will be noted that the cylinders 26 and 26a are mounted on a bracket 54 which is affixed to the axle structure.

When it is desired to fix a flat tire the bleed valves 49 and 49a are opened so that the pressure on top of the pistons is relieved. Thus the pistons and accompanying rollers are moved up out of engagement with the tires and the wheel may be removed. Once the flat tire is fixed, the bleed valves are closed and the desired pressure is again applied against the pistons.

It is to be understood that the present invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

From the foregoing, it will be seen that I have developed a simple and efficient warning device for deflated tires which is practical and sturdy. Although the present invention is particularly concerned with the problem inherent in commercial vehicles employing dual wheels, the device is also adapted for single wheel suspensions in passenger cars and race cars. The device is particularly well suited for any vehicle which is used in long distance driving or driving at relatively high speeds since there is a greater chance of developing a leak or overheating a tire under these conditions.

Having thus described my invention, I claim:

1. A warning device for use with a vehicle having a wheel suspended therefrom and a tire thereon to indicate when such tire becomes soft, comprising a rotatable roller engaging said tire, a spindle extending axially through the center of said roller at one end, a cylinder adapted for attachment to the vehicle structure, a piston disposed in said cylinder and engaged with said spindle at its other end so that said spindle extends laterally away from said cylinder, said cylinder being disposed in a fluid circuit so that pressure may be exerted upon said piston to hold said piston in engagement under pressure on said tire, and indicating means adapted for actuation by the linear movement of said spindle which is effected by a soft tire lessening the resistance to said roller.

2. A warning device as claimed in claim 1 and further characterized in that said roller is formed to the contour of the periphery of said tire to provide effective engagement between said roller and said tire and to provide an even distribution of pressure upon said tire.

3. A warning device for use with a vehicle having a wheel suspended therefrom and a tire thereon to indicate when such tire becomes soft, comprising a rotatable roller engaging said tire, a spindle extending axially through the center of said roller at one end, a cylinder adapted for attachment to the vehicle structure, a piston disposed in said cylinder and engaged with said spindle so that said spindle extends laterally away from said cylinder, said cylinder being disposed in a fluid circuit so that pressure may be exerted upon said piston to hold said roller in engagement under pressure on said tire, a first electrical contact disposed on said spindle, a second electrical contact disposed apart from said spindle, said first and second contacts being connected through an electrical circuit which includes warning means, said first contact being moved into contact with said second contact by the linear movement of the spindle to close the circuit and actuate the warning means, such linear movement of said spindle being effected by the decreased resistance of the tire to said roller.

4. A warning device for use with a vehicle having a wheel suspended therefrom and a tire thereon to indicate when said tire becomes soft, comprising a rotatable roller engaging the peripheral road-contacting surface of the tire, a spindle disposed adjacent the peripheral road-contacting surface of the tire and extending axially through the center of said roller at one end, means engaging said spindle for holding said roller in contact with the peripheral road-contacting surface of the tire, and indicating means for indicating the displacement of said spindle when said tire becomes soft and reduces the resistance to said roller, thus effecting displacement of the spindle.

THOMAS J. FINAN.

References Cited in the file of this patent

UNITED STATES PATENTS

| Number | Name | Date |
|---|---|---|
| 1,289,307 | Thompson | Dec. 31, 1918 |
| 1,305,315 | Stahl | June 3, 1919 |
| 2,213,782 | Kite | Sept. 3, 1940 |
| 2,317,509 | Anderson | Apr. 27, 1943 |

FOREIGN PATENTS

| Number | Country | Date |
|---|---|---|
| 372,496 | Germany | July 16, 1921 |